United States Patent [19]

Ono

[11] 3,898,675
[45] Aug. 5, 1975

[54] CAMERA PROVIDED WITH ELECTRONIC SHUTTER OF THE TYPE AUTOMATICALLY CONTROLLING EXPOSURE TIME

[75] Inventor: Shigeo Ono, Yokohama, Japan

[73] Assignee: Nippon Kogaku K.K., Tokyo, Japan

[22] Filed: May 23, 1973

[21] Appl. No.: 362,949

Related U.S. Application Data

[63] Continuation of Ser. No. 82,433, Oct. 20, 1970, abandoned.

[30] Foreign Application Priority Data

Oct. 28, 1969  Japan................................ 44-85677

[52] U.S. Cl.................... 354/24; 354/51; 354/60 R; 354/60 E
[51] Int. Cl............................ G03b 7/08; G03b 9/62
[58] Field of Search ........ 95/10 CT, 53 FB; 354/24, 354/50, 51, 60 R

[56] References Cited
UNITED STATES PATENTS

| | | | |
|---|---|---|---|
| 2,482,980 | 9/1949 | Kallmann | 250/41.5 |
| 3,205,795 | 9/1965 | Grey | 95/10 |
| 3,426,357 | 2/1969 | Paulus | 95/10 CT |
| 3,470,798 | 10/1969 | Miyakawa | 95/10 CT |
| 3,533,348 | 10/1970 | Yanagi | 95/53 |
| 3,636,842 | 1/1972 | Nobusawa | 95/10 CT |
| 3,657,979 | 4/1972 | Nobusawa | 95/10 CT |
| 3,670,637 | 6/1972 | Mori et al. | 95/10 CT |

FOREIGN PATENTS OR APPLICATIONS

| | | | |
|---|---|---|---|
| 44-19747 | 8/1969 | Japan | 95/10 CT |
| 44-18672 | 8/1969 | Japan | 95/10 CT |

*Primary Examiner*—Samuel S. Matthews
*Assistant Examiner*—Russell E. Adams, Jr.
*Attorney, Agent, or Firm*—Fitzpatrick, Cella, Harper & Scinto

[57] ABSTRACT

A camera having an improved type electronic shutter which consists of two circuits, one of them converts the geometric progression variation in the brightness of a subject to be photographed into the arithmetic progression variation in the output voltage, and stores the voltage in a capacitor, the other gives an output voltage which is in proportion to a logarithm of the time passed from the beginning of the opening of the shutter. The closing of the shutter is actuated in response to a difference between said two output voltages reaches a predetermined value. This invention provides a simple and stable electronic shutter control device, and precisely controlled exposure time is attained because the characteristic of a photoconductive element is well corrected.

2 Claims, 2 Drawing Figures

PATENTED AUG 5 1975 3,898,675

CAMERA PROVIDED WITH ELECTRONIC SHUTTER OF THE TYPE AUTOMATICALLY CONTROLLING EXPOSURE TIME

BACKGROUND OF THE INVENTION

In order to automatically control an exposure time in response to an output of a photosensitive element placed backwardly of a pentaprism in a single lens reflex camera provided with an electronic shutter, the beam of light incident upon the photosensitve element is interrupted when a mirror is retracted so that the intensity of light immediately before the mirror is retracted must be memorized whereby an exposure time of the shutter may be controlled in response to this memorized information.

To solve this problem, there has been proposed a method in which there is provided a circuit for generating an output voltage which is in proportion to a logarithm of variation in resistance of the photosensitve element receiving the beam of light passing through a picture taking lens (This circuit will be referred to as "logarithmic compression circuit" hereinafter); the output of this circuit is stored and applied as an input to a circuit (to be referred to as "logarithmic expansion circuit" hereinafter) of the type whose variation in output resistance in logarithm is made in proportion to the input variation; and the logarithmically expanded output is applied to a time-constant circuit. The principle of the logarithmic expansion circuit is based on the fact that in the region in which the space between the drain and source of a field-effect transistor may be regarded as a resistor, that is in the region in which the current flowing from the source to drain is in proportion to a voltage between them, the logarithm of a resistance between the drain and source is inversely proportional to the voltage between them. However, the field-effect transistors exhibit such characteristic as described above only when the voltage between the drain and source is of very small order of 0.1 volt. Furthermore, the resistance between the drain and source is extremely high so that there arises many problems in providing a circuit which ensures a stable function in practice.

SUMMARY OF THE INVENTION

It is therefore one of the objects of the present invention to provide a control system to be described in more detail hereinafter in order to overcome the problems of the prior art logarithmic expansion circuit. In brief, the present invention provides a circuit for converting the geometric progression variation in the brightness of a subject to be photographed into the arithmetic progression variation in output voltage, a circuit including a capacitor for storing said output voltage, a circuit whose output voltage variation is in proportion to a logarithm of a time from the time the opening of a shutter is started, and a switching circuit actuable in response to a difference between said two output voltages, whereby when the difference between said two output voltages reaches a predetermined value, the closing of the shutter may be started.

The advantages of the present invention may be summarized as follows:

1. an electronic shutter control device with a memory simple in construction and reliable and dependable in operation may be provided;
2. a very precisely controlled exposure time may be attained because the characteristic of a photosensitive element may be well calibrated;
3. an exposure time may be controlled in response to a wide range of stops of a picture taking lens and of sensitivity of films; and
4. a previous exposure time indication may be possible.

BRIEF DESCRIPTION OF THE DRAWING

The present invention will be explained in detail referring to the attached drawings in which.

DESCRIPTION OF THE PREFERRED EMBODIMENTS

Figure 1:
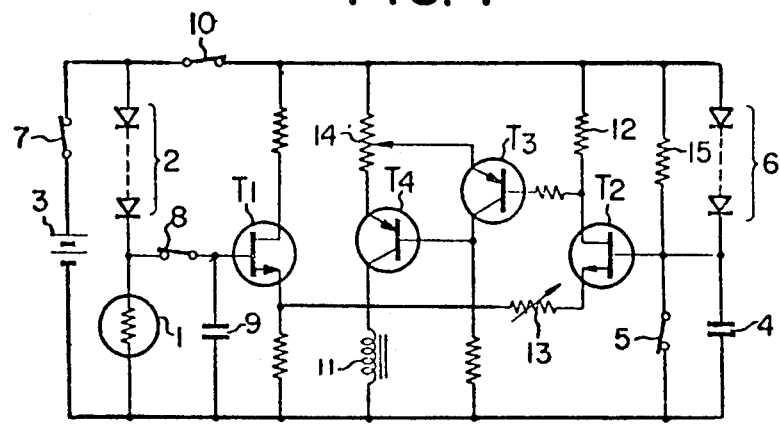
FIGS. 1 and 2 are circuit diagrams of a first and second embodiments in accordance with the present invention.

Referring to FIG. 1, a photoconductive element 1 and a diode 2 are connected in series to an electric power source 3. It is well known that the current $i$ flowing through the diode 2 is correlated with the voltage $Vd$ across it with the following relation;

$$Vd = h \log \left( \frac{i}{i_s} + 1 \right) \quad (I)$$

where $i_s$ = saturated current in the reverse direction, $$h = kT/q$$

where $k$ = Boltzman's constant
$T$ = absolute temperature, and
$q$ = charge of electron.

Since the value of $i_s$ is extremely small and 1 may be neglected when $i$ is higher than several nano ($10^{-9}$) amperes, Eq. (I) may be approximated $$Vd = h \log i + Vo \quad (II)$$

When the voltage of the power source is $V$ and the resistance of the photoconductive element $l$ is $R$, $$V = h \log i + Vo + iR \quad (III)$$

The relation between the resistance $R$ of the photoconductive element and the brightness $B$ of a subject to be photographed is given by:

$$R = kB^{-\gamma} \quad (IV)$$

where $\gamma$ = constant inherent to a photoconductive element. From Eqs. (III) and (IV), $$V = h \log i = Vo = ikB^{-\gamma} \quad (V)$$

Since the first term is very small as compared with the second and third terms, it may be neglected so that $$i \approx \frac{v - Vo}{k} B^\gamma \quad (VI)$$

That is, $$\log i = \log \frac{V - V_o}{k} + \gamma \log B \quad \text{(VII)}$$

Substituting Eq. (VII) into Eq. (II), we have $$Vd = h\gamma \log B + h \log \frac{V - V_o}{k} + V_o \quad \text{(VIII)}$$

That is, the logarithm of the brightness $B$ of the subject to be photographed is proportional to the voltage across the diode. In general, the voltage $Vdm$ across a series of $m$ diodes connected in series is given by $$Vdm = m\left(h\gamma \log B + h \log \frac{V - V_o}{k} + V_o\right) \quad \text{(IX)}$$

Next a capactor 4 is generally short-circuited by a switch 5 connected in parallel with the capacitor 4 and is charged through diodes 6 from the power source 3 when the switch 5 is opened in connection with the open movement of the shutter. The charging current is given by $$i = C \frac{dVc}{dt} \quad \text{(X)}$$

where
  $C$ = capacitance of the capacitor, and
  $Vc$ = voltage across the capacitor $t$ seconds after charging.

From Eqs. (II) and (X), we have $$V = Vc + h \log C\left(\frac{dVc}{dt}\right) + V_o \quad \text{(XI)}$$

$$dt = Ce^{-\frac{V - Vc - V_o}{h}} dVc$$

$$t = Ce^{-\frac{V - V_o}{h}} \int e^{\frac{Vc}{h}} dVc$$

$$= Che^{-\frac{V - V_o - Vc}{h}} + A$$

and
$Vc = o$ when $t = o$
we have $$A = -Che^{-\frac{V - V_o}{h}}$$

Hence, $$t = Che^{-\frac{V - V_o}{h}} \left(e^{-\left(\frac{Vc}{h}\right)} - 1\right) \quad \text{(XII)}$$

$$Vc = h \log\left(\frac{1}{Ch} e^{\frac{V - V_o}{h}} t + 1\right)$$

Since 1 in the parentheses is negligible, we have $$Vc = V - V_o + h \log \frac{t}{Ch} \quad \text{(XIII)}$$

That is, the voltage across the capactitor is proportional to the logarithm of the charging time. The relation between $Vc$ and $t$ when the capacitor is charged through n series-connected diodes is generally given by $$Vc = v - nV_o + nh \log \frac{t}{nCh} \quad \text{(XIV)}$$

When the difference between $Vdh$ and $Vc$ becomes a predetermined value, for example when $V - Vdn = Vc$, the shutter is closed. Then, $t$, that is, the exposure time of the shutter may be correlated with the brightness of the subject B as follows:

$$nV_o - nh \log \frac{t}{nCh} = mh\gamma \log B + mh \log \frac{V - mV_o}{k} + mV_o$$

Hence, $$B^{\frac{m}{n}\gamma} t = Cnh \left(\frac{k}{V - mV_o}\right)^{\frac{m}{n}} e^{\frac{V_o}{h}\left(1 - \frac{m}{n}\right)} = \text{constant}$$

When $\gamma = 1$, and $m = n$, $$Bt = \frac{mChk}{V - mV_o} = \text{constant}. \quad \text{(XV)}$$

When $\gamma \neq 1$, $m$ and $n$ may be so selected that $n/m = \gamma$. Therefore, $$Bt = Cnh \sqrt[\gamma]{\frac{k}{V - mV_o}} e^{\frac{V_o}{h}\left(1 - \frac{1}{\gamma}\right)} = \text{constant} \quad \text{(XVI)}$$

Thus, the condition for automatically controlling the exposure time of the shutter in response to the brightness B may be satisfied.

Based upon the above described principle, in the first embodiment, there are provided differential amplifiers $I_1$ and $T_2$ so that $V - Vdn$ and $Vc$ may be applied to two inputs and switching circuits $T_3$ and $T_4$ which are actuated in response to the outputs of these differential amplifiers, which are field effect transistors. The voltage $V - Vdn$ is applied to the gate of the FET $T_1$, that is to one of the inputs of the differential amplifier circuit through a switch 8 when a power source switch 7 is closed. This voltage is stored in a capacitor 9 connected between the gate of the FET $T_1$ and the negative polarity of the power source 3. For instance in order to automatically control the exposure time in response to the output of the photosensitive element disposed backwardly of a penta-prism of a single-lens reflex camera, the intensity of light measured immediately before the mirror is retracted must be stored because when the mirror is retracted, no light is incident upon the photosensitive element. The switch 8 is opened immediately before the mirror is retracted. Even when the switch 10 is closed in order to actuate the shutter, the capacitor 4 is still short-circuited by the switch 5 so that the potential at the gate of FET $T_2$ is exceedingly lower than that of FET $T_1$. That is, FET $T_2$ is almost cut off. In consequence, a transistor $T_3$ is nonconductive while a transistor $T_4$ is conductive. The current flows through a coil 11 of a magnet in the collector circuit of the transistor $I_4$ so that the shutter is prevented from closing. In response to the opening of the shutter the switch 5 is opened so that the capacitor 4 is charged through the diodes 6. When the voltage $V_c$ across the capacitor 4 becomes nearly equal to $V - V_{dn}$, the current suddenly starts to flow through the FET $T_2$ so that voltage drop occurs through a resistor 12 thus lowering the base potential of the transistor $T_3$. Therefore, the transistor, $T_3$ is rendered conductive while the base potential of the transistor $T_4$ is increased so that the emitter potential is lowered. Consequently, the transistor $T_4$ is cut off so that the magnet 11 is deenergized, whereby the shutter is closed. The exposure time $t$ thus controlled depends upon the brightness B of the subject as shown in Eqs. (XV) and (XVI).

It is seen that when $n/m = \gamma$ as shown in Eq. (XVI), the characteristics of the photoconductive elements may be suitably corrected or calibrated. This means that photoconductive elements having various kinds of characteristics may be employed, but it is preferable that the numbers of diodes 2 and 6 are equal in view of the stability of the circuit in case of power source voltage variation and temperature variation. The photoconductive elements such as Cds have generally $\gamma$ less than unity so that in the first embodiment shown in FIG. 1, the FET $T_2$ is provided with a source resistor 13 in order to attain the correction of $\gamma$ by suitably selecting the value of the source resistor 13. More specifically when the capacitor 4 is charged, the input voltage of the FET $T_2$ increases thereby increasing its drain current. However, the voltage drop across the resistor 13 is applied between the gate and source as negative feedback so that the increase of the drain current may be suppressed. In other words, the apparent input voltage of the FET $T_2$ becomes less than that of the FET $T_1$. Since the minute adjustment of the resistor 13 is possible, the photoconductive elements with any $\gamma$ may be advantageously employed.

The exposure factors such as stop of a picture taking lens, sensitivity of film, etc., may be set by a potentiometer 14 whose center tap is for instance coacted with the setting of the stop value and the film sensitivity so as to vary a trigger level. Since the input to the amplifier is $\log B$ or $\log t$, the magnitude of variation in output of the amplifer with respect to the variation in one step in exposure factor $B$ or $t$ is constant. Consequently, the control in a wide range becomes possible by the adjustment of the potentiometer 14.

When an exposure time is very longer, the current charging the capacitor 4 becomes less so that there arises a problem of the leakage of the capacitor 4. To overcome this problem, a resistor 15 having a relatively large value is connected in parallel with the diodes 6.

Figure 2:
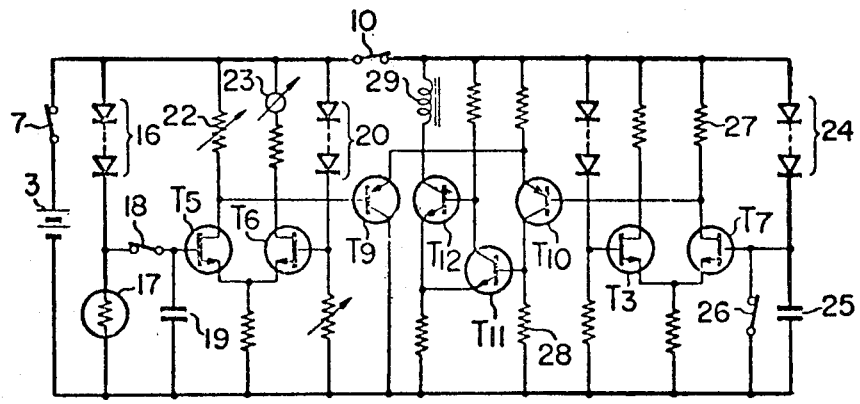

In the second embodiment illustrated in FIG. 2, the output of a logarithm-compression circuit comprising a diode train 16, and a photoconductive element 17 is stored in a capacitor 19 through a switch 18. The voltage across the capacitor 19 is applied to the gate of a field-effect transistor $T_5$ which constitutes together with another field-effect transistor $T_6$ a first difference amplifier. To another input, that is the gate of the FET $T_6$ is applied a voltage across an adjustable resistor 21 connected in series to a diode train 20 whose number is equal to the diode train 16. Since the variable resistor 21 is adjusted in response to the exposure factors such as stop of a picture taking lens, a sensitivity of a film, etc., the voltage across the resistor 21 applied to the gate of the FET $T_6$ is of course correlated with the exposure factor. Thus a voltage across an output resistor of the FET $T_5$ becomes a function of the brightness of the subject as well as the stop and sensitivity of film. an indicator 23 is incorporated with the drain circuit of the FET $T_6$ for previously indicating a controlled exposure time. The indicator 23 may be in circuit with the drain circuit of the FET $T_5$ or interconnected between the drains of the FETs $T_5$ and $T_6$.

A capacitor charging circuit comprises a diode train 24 a capacitor 25 and a switch 26 connected in parallel with the capacitor 25, as in the case of the first embodiment. It may be possible to compare the voltage across the capacitor 25 with the voltage across the output resistor 26, but in the second embodiment in view of the power source voltage and temperature variations, the voltage across the capacitor 25 is once fed into a second differential amplifier comprising field-effect transistors $T_7$ and $I_8$ so as to become a voltage across an output resistor 27 for comparison.

The voltage across the output resistors 22 and 27 are applied to the inputs of a third differential amplifier comprising transistors $T_9$ and $I_{10}$. Since the switch 26 short-circuits the capacitor 25 before the shutter is actuated, the input to the transistor $T_9$ is higher than that to the transistor $T_{10}$ so that no current flows through the transistor $T_{10}$. In consequence, the base potential of a transistor $T_{11}$ of a switching circuit comprising said transistor $T_{11}$ and another transistor $T_{12}$ is almost zero. The switching circuit is actuated in response to a voltage across an output resistor 28. Therefore, the transistor $T_{11}$ is OFF while the transistor $T_{12}$ is ON so that a magnet 29 is energized, whereby the movement of the closing of the shutter is prevented. When the switch 26 is opened in response to the opening of the shutter, the capacitor 25 is charged so that the current suddenly flows through the transistor $T_{10}$. Therefore, the voltage across the resistor 28 increases and the transistor $T_{11}$ is rendered conductive while the transistor $T_{12}$ is rendered non-conductive. in consequence, the magnet 29 is de-energized so that the movement of the closing of the shutter begins.

In the second embodiment, the voltage gain may be minutely controlled by the variable resistor 22 so that the second embodiment has the advantages that the voltage stored in the capacitor 19 may be linearly expanded or compressed so as to correct or calibrate the $\gamma$ of the photoconductive element and that the previous indication of a controlled exposure time may be attained in a simple manner as described hereinbefore.

What is claimed is:

1. In a camera having an objective lens and an electronically controlled shutter moveable between closed and open positions, an exposure control arrangement comprising:
- a photoconductor element positioned to receive the light passing through the objective lens;
- first diode means series connected with said photoconductor element;
- capacitor memory means;
- switching means for coupling said capacitor memory means to the junction of said photoconductor element and said first diode means during the interval when the light passing through said objective lens is incident on said photoconductor element and for disconnecting said capacitor memory means from said photoconductor when the light passing through said objective lens is not incident on said photoconductor element;
- an adjustable resistor variable in resistance in proportion to variation in the film sensitivity and the aperture objective lens aperture opening of said camera;
- second diode means series connected with said adjustable resistor;
- a source of operating potential having first and second terminals;
- circuit means connecting said photoconductor element and said adjustable resistor electrically together and to said first terminal, and for connecting said first and second diode means together and to said second terminal;
- a differential amplifier having first and second input terminals and an output terminal;
- circuit means connecting said capacitor means to said first input terminal of said differential amplifer memory and connecting the junction of said adjustable resistor and said second diode means to said second input terminal of said differential amplifier;
- time generator means for generating a first voltage proportional to a logarithm of the time lapse interval beginning with movement of said shutter to said open position, said time generating means including a timing capacitor, third diode means series connected to said timing capacitor, trigger switching means connected across said timing capacitor and adapted normally to short circuit said timing capacitor and to open upon movement of said shutter to open position, a resistor, fourth diode means series connected to said resistor, a source of operating potential having first and second terminals, circuit means connecting said timing capacitor and said resistor together and to said first terminal, further circuit means connecting said third and fourth diode means together and to said second terminal, a second differential amplifer having first and second input terminals and an output terminal, circuit means connecting the junction of said timing capacitor and said third diode means to said first input terminal of said second differential amplifer, and further circuit means connecting the junction of said resistor and said fourth diode means to said second input terminal of said second differential amplifier;
- comparison circuit means having two input terminals, one being coupled to said output terminal of said differential amplifier and the other being coupled to said time generator means, for comparing said output voltage of said differential amplifier and said first voltage and producing an output signal when the difference between said voltages reaches a predetermined value; and
- shutter actuating circuit means responsive to said output signal of said comparison circuit means for returning said shutter to said closed position.

2. In a camera, an exposure control arrangement according to claim 1 wherein said combining circuit means includes:
- a third differential amplifer having first and second input terminals and an output terminal; and
- circuit means connecting said first input terminal of said third differential amplifier to said output terminal of said differential amplifier and connecting said second input terminal of said third differential amplifier to said output terminal of said second differential amplifier.

* * * * *

UNITED STATES PATENT OFFICE
CERTIFICATE OF CORRECTION

Patent No. 3,898,675                    Dated August 5, 1975

Inventor(s) SHIGEO ONO                  Page 1 of 4

It is certified that error appears in the above-identified patent and that said Letters Patent are hereby corrected as shown below:

IN THE ABSTRACT

Line 4, delete "the arithmetic" and insert --an output voltage proportional to a logarithm of the value of the brightness of said subject,--;

Line 5, delete "progression. . .voltage,";

Line 7, delete "in proportion" and insert --proportional--;

Line 9, delete "in re-";

Line 10, delete "sponse to a" and insert --when the--;

IN THE SPECIFICATION

Col. 1, Line 26, delete "in logarithm is made in proportion to the" and insert --is proportional to the antilogarithm of the--;

Col. 1, Line 33, delete "from the source to drain" and insert --through the source and drain--;

Col. 1, Line 36, delete "them." and insert --the gate and source.--; and delete "the" (second occurrence);

(Cont'd.)

UNITED STATES PATENT OFFICE
CERTIFICATE OF CORRECTION

Patent No. 3,898,675    Dated August 5, 1975

Inventor(s) SHIGEO ONO

It is certified that error appears in the above-identified patent and that said Letters Patent are hereby corrected as shown below:

Col. 1, Line 39, after "order" insert --,-- and delete "of" (second occurrence) and insert --such as--;

Col. 1, Line 41, delete "there arises" and after "problems" insert --arise--;

Col. 1, Line 52, delete "geometric progression";

Col. 1, Line 53, delete "the";

Col. 1, Line 54, delete in its entirety and insert --an output voltage proportional to a logarithm of the value of said brightness, a--;

Col. 2, Line 13, delete "a";

Col. 2, Line 37 and 38, should read as follows: --Since the value of $i_s$ is extremely small and 1 may be neglected when i is higher than several nano ($10^{-9}$) amperes, Eq. (1) may be approximated--;

Col. 2, Line 40 and 41, change Equation (II) to read as follows:

$$Vd = h \log i + Vo, \text{ where}$$

$$Vo = h \log i_s$$

(Cont'd.)

UNITED STATES PATENT OFFICE
CERTIFICATE OF CORRECTION

Patent No. 3,898,675  Dated August 5, 1975

Inventor(s) SHIGEO ONO

It is certified that error appears in the above-identified patent and that said Letters Patent are hereby corrected as shown below:

Col. 2, Line 59, change Equation (V) to read as follows:

$$V = h \log i + Vo + ikB^{-\gamma}$$

Col. 3, change Equation (IX) to read as follows:

$$Vdm = m \left( h \gamma \log B + h \log \frac{V - mVo}{k} + Vo \right)$$

Col. 3, change the first expression of equation (XII) to read as follows:

$$t = Che^{-\frac{V - Vo}{h}} \left( e^{\frac{Vc}{h}} - 1 \right)$$

Col. 4, Line 17, after "Vc," insert --where Vdn = Vdm,--;

Col. 4, Line 53, change "Vdn" to --Vdm-- and after "Vc" insert --respectively--;

Col. 4, Line 57, change "Vdn" to --Vdm--;

Col. 5, Line 13, change "$I_4$" to --$T_4$--;

Col. 5, Line 17, change "Vdn" to --Vdm--;

Col. 5, Line 18, after "that" insert --a--;

Col. 5, Line 37, change "Cds" to --CdS--;

Col. 5, Line 62 "longer" to --long--;

(Cont'd.)

UNITED STATES PATENT OFFICE
CERTIFICATE OF CORRECTION

Patent No. 3,898,675            Dated August 5, 1975

Inventor(s) SHIGEO ONO

It is certified that error appears in the above-identified patent and that said Letters Patent are hereby corrected as shown below:

Col. 6, Line 16, after "resistor" insert --22--;

Col. 6, Line 29, delete "26" and insert --22--;

Col. 6, Line 33, change "$I_8$" to --$T_8$--;

Col. 6, Line 35, change "voltage" to --voltages--;

Col. 6, Line 37, change "$I_{10}$" to --$T_{10}$--;

Col. 6, Line 54, change "in" to --In--;

Signed and Sealed this twentieth Day of April 1976

[SEAL]

Attest:

RUTH C. MASON  
*Attesting Officer*

C. MARSHALL DANN  
*Commissioner of Patents and Trademarks*